United States Patent
McKenna et al.

(10) Patent No.: US 9,310,886 B2
(45) Date of Patent: Apr. 12, 2016

(54) TRANSIENT MESSAGE DISPLAY CONTROL

(71) Applicant: Lenovo (Singapore) Pte. Ltd., Singapore (SG)

(72) Inventors: Shirley Mary McKenna, Raleigh, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 136 days.

(21) Appl. No.: 14/179,911

(22) Filed: Feb. 13, 2014

(65) Prior Publication Data

US 2015/0227195 A1  Aug. 13, 2015

(51) Int. Cl.
*G06F 3/01* (2006.01)

(52) U.S. Cl.
CPC .................... *G06F 3/013* (2013.01)

(58) Field of Classification Search
CPC ................ G06F 3/012–3/013; H04N 13/0484
See application file for complete search history.

(56) References Cited

U.S. PATENT DOCUMENTS

| | | | | |
|---|---|---|---|---|
| 6,078,310 A | * | 6/2000 | Tognazzini | G06F 3/013 345/158 |
| 7,975,015 B2 | * | 7/2011 | Horvitz | G06Q 10/107 709/203 |
| 8,957,847 B1 | * | 2/2015 | Karakotsios | G06F 3/013 345/156 |
| 2006/0179127 A1 | * | 8/2006 | Randall | H04M 19/04 709/219 |
| 2006/0256083 A1 | * | 11/2006 | Rosenberg | G06F 3/013 345/156 |
| 2012/0001923 A1 | * | 1/2012 | Weinzimmer | G06F 3/013 345/473 |

* cited by examiner

*Primary Examiner* — Dorothy Harris

(74) *Attorney, Agent, or Firm* — Schwegman, Lundberg & Woessner, P.A.

(57) ABSTRACT

A method includes observing via a camera of a device and a gaze tracking function that a user is looking at a transient message displayed on a display screen of a device, determining a time to remove the transient message from the display screen as a function of the observing, and removing the transient message as a function of the determined time.

11 Claims, 3 Drawing Sheets

TRANSIENT MESSAGE DISPLAY CONTROL

BACKGROUND

Transient messages are displayed on devices with displays, such as smart phones, tablets, laptop computers, and other processor driven devices. Such messages may have a static length of time they are displayed prior to fading or otherwise being removed from the display. Since the messages may be removed from the display after some time, the user may not have been aware of or read the message prior to its removal. Removal of the message may also be delayed by a user performing a physical action, such as moving a cursor over the message. The messages may also be dismissed by some physical action of the user.

SUMMARY

A method includes observing via a camera of a device and a gaze tracking function that a user is looking at a transient message displayed on a display screen of a device, determining a time to remove the transient message from the display screen as a function of the observing, and removing the transient message as a function of the determined time.

A machine readable storage device has instructions for execution by a processor of the machine to perform observing via a camera of a device and a gaze tracking function that a user is looking at a transient message displayed on a display screen of a device, determining a time to remove the transient message from the display screen as a function of the observing, and removing the transient message as a function of the determined time.

A device includes a processor, a camera, and a memory device having a program stored thereon for execution by the processor to observe via a camera of a device and a gaze tracking function that a user is looking at a transient message displayed on a display screen of a device, determine a time to remove the transient message from the display screen as a function of the observing, and remove the transient message as a function of the determined time.

DETAILED DESCRIPTION

Figure 1:
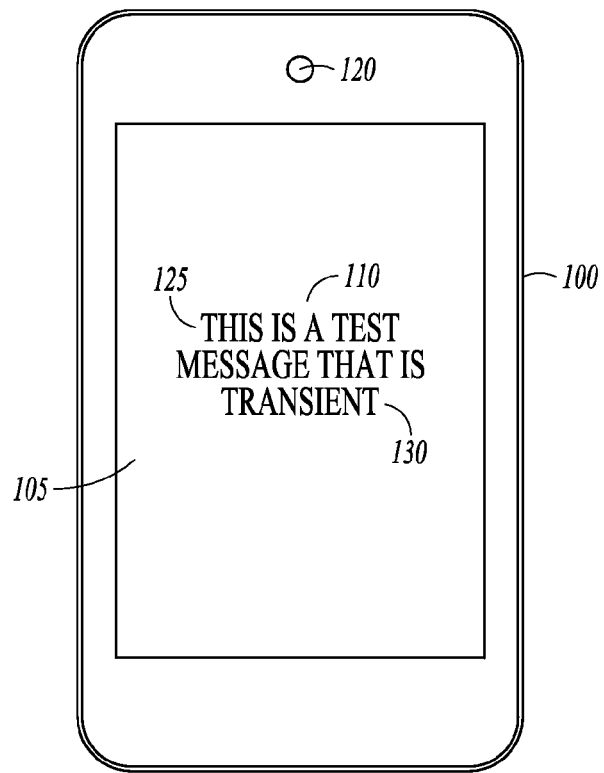
FIG. 1 is a block diagram of a device showing a transient message on a display according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system. The article "a" or "an" means "one or more" unless explicitly limited to a single one.

In various embodiments, a device determines if a user of the device is looking at a transient message using gaze tracking. The message is then faded out or otherwise removed from a display of the device based on the gaze tracking determination. The length of time prior to removal or fading may be based on whether the gaze tracking indicates that the user has reached the end of the transient message if accuracy of gaze tracking permits such a determination. In a further embodiment, the removal of the message may be based on a length of time corresponding to an estimate of how long it takes to read the message following the determination that the user is looking at the transient message.

If the transient message is faded, the fade-out time may be exponential, starting to fade slowly at first, but fading much faster over time, allowing the user to easily still read the message at the beginning of the fade-out. In still further embodiments, a reading speed of the user may be calculated utilizing gaze tracking of previous messages.

The calculated reading speed may be used to determine a length of time to display the transient message as a function of the length of the message to ensure the user has sufficient time to completely read the transient message. Longer messages may be displayed for a longer period than shorter messages.

In a further embodiment, gaze tracking may be used to determine that the user has not completely read the message prior to looking away from the message, which may result in delaying fading until it is determined that the user has again looked at the message. The total gaze time on the message may be used to trigger removal of the message.

FIG. 1 is a block diagram of a device 100 having a display 105 on which a transient message 110 may be displayed. The transient message may be a toast type of message generated from an operating system, a notification generated from a task or application, or any other type of message that provides information to a user of the device 100. A camera 120 may also be included proximate the display and suitable for providing images of a user to detect and track where a user is looking on the display. Such images provide the ability to perform gaze tracking, which may be correlated with a position of a message to determine whether or not the user is looking at the message. If sufficient accuracy is provided by the camera and corresponding gaze tracking features, the device 100 may also detect where in the message 110 the user is gazing and may be able to distinguish whether a user is looking at a beginning 125 of the message or an end 130 of the message. A granularity of detection corresponding to individual words may be provided in some embodiments. In other embodiments, a minimum granularity of detecting whether the user is looking at any portion of the message may be sufficient.

Figure 2:
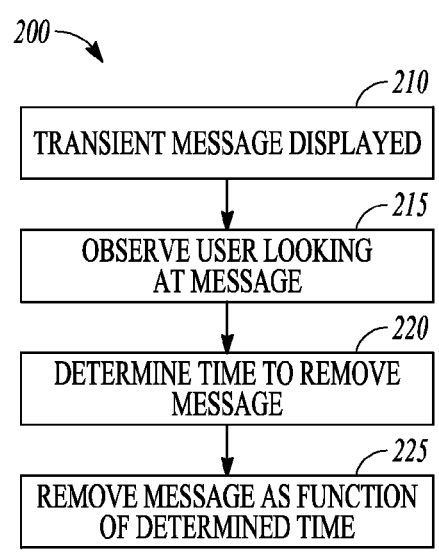
FIG. 2 is a flowchart illustrating a method of displaying a transient message according to an example embodiment.

FIG. 2 is a flowchart illustrating a method 200 of displaying a transient message according to an example embodiment. The message may originate in many different places. If the operating system, such as Windows 8 originates a toast message for example, the operating system may have code to perform all or most of the method steps. In further embodiments, the operating system, an application, middleware, or other software may contain code to perform the method, or the code may be distributed to different software components in further embodiments.

At 210, a transient message is received or generated and displayed. At 215, the method 200 observes via the camera of the device and gaze tracking functions that a user is looking at a transient message displayed on a display screen of a device. In one embodiment, observing may include detecting a position of the transient message at which the user is looking. At 220, a time is determined to remove the transient message from the display screen as a function of the observing. Determining a time to remove the message may correspond to the user looking at an end of the transient message.

In further embodiments, the time is determined based on a total length of time that the user has looked at the transient message. In still further embodiments, the total length of time that the user has looked at the transient message may include multiple different times that the user has looked at the transient message. In further embodiments the time to remove the message is a function of observing that the user has looked at the entire message. The determined time may also be a fixed amount of time starting from when it is first observed that the user is looking at the transient message.

At 225, the transient message is removed from the display as a function of the determined time. Removing the transient message may be done in many different ways. The transient message may be faded starting at the determined time, and may be exponentially faded in some embodiments.

Figure 3:
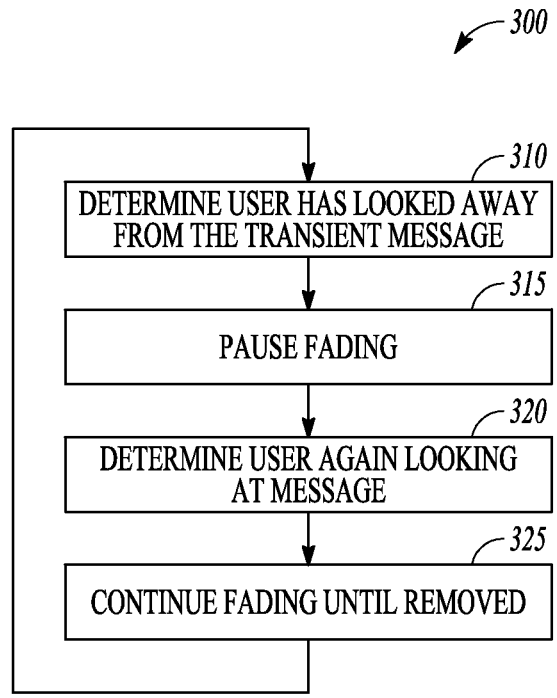
FIG. 3 is a flowchart illustrating a method of fading a transient message according to an example embodiment.

FIG. 3 is a flowchart illustrating a method 300 of fading that may include determining that a user has looked away from the transient message at 310. If it is so determined, the fading may be paused at 315. At 320, it is determined that the user is looking back at the transient message. At 325 the fading is continued when it is determined that the user is looking back at the transient message. In one embodiment, the transient message may be emphasized when it is observed that the user is looking at the transient message. The emphasis may be a brightening of the message in some embodiments.

Figure 4:
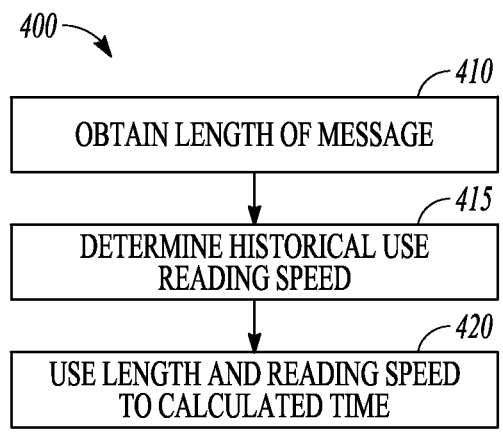
FIG. 4 is a flowchart illustrating a method of determining a time for removing a transient message according to an example embodiment.

FIG. 4 is a flowchart illustrating a method 400 of determining a time for removing the message. At 410 a length of the transient message is obtained. At 415, a historical reading speed of the user may be determined. This time may be set by the user, statistically determined from times taken to read previous messages, or actual lengths of time taken for a user to physically act to dismiss previous messages in various embodiments. At 420, the length of the transient message and the reading speed of the user are used to calculate the time.

Figure 5:
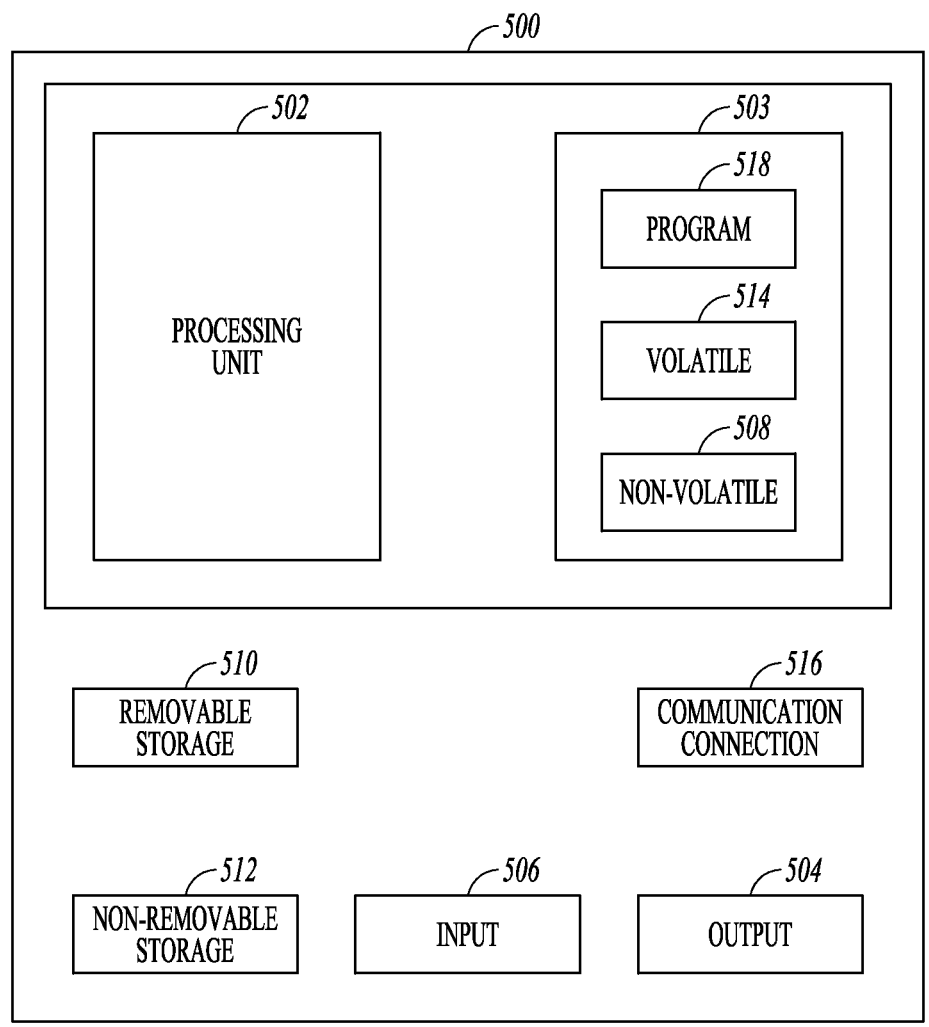
FIG. 5 is a block diagram of computer system used to implement methods according to example embodiments.

FIG. 5 is a block schematic diagram of a computer system 500 to implement device 100 and other computing resources according to example embodiments. All components need not be used in various embodiments, such as for mobile devices including laptop computers, smart phones, touchpads, and other devices. One example computing device in the form of a computer 500, may include a processing unit 502, memory 503, removable storage 510, and non-removable storage 512. Sensors 115 and 125 may be coupled to provide data to the processing unit 502. Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 500 may include or have access to a computing environment that includes input 506, output 504, and a communication connection 516. Output 504 may include a display device, such as a touchscreen, that also may serve as an input device. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 500. A hard drive, CD-ROM, and RAM are some examples of articles including a non-transitory computer-readable medium. For example, a computer program 518 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 500 to provide generic access controls in a COM based computer network system having multiple users and servers.

EXAMPLES

1. A method comprising:
observing via a camera of a device and a gaze tracking function that a user is looking at a transient message displayed on a display screen of a device;
determining a time to remove the transient message from the display screen as a function of the observing; and removing the transient message as a function of the determined time.

2. The method of example 1 wherein the observing comprises detecting a position of the transient message at which the user is looking.

3. The method of example 2 wherein determining a time to remove the message corresponds to the user looking at an end of the transient message.

4. The method of example 3 wherein removing the transient message comprises fading the message starting at the determined time.

5. The method of example 4 wherein fading the transient message comprises exponentially fading the transient message.

6. The method of any of examples 4-5 wherein fading the message comprises:
determining that a user has looked away from the transient message;
pausing the fading;

determining that a user is looking back at the transient message; and
continuing the fading when it is determined that the user is looking back at the transient message.

7. The method of any of examples 1-6 wherein the time is determined based on a total length of time that the user has looked at the transient message.

8. The method of example 7 wherein the total length of time that the user has looked at the transient message includes multiple different times that the user has looked at the transient message.

9. The method of any of examples 1-8 wherein determining a time comprises:
obtaining a length of the transient message;
obtaining a historical reading speed of the user; and
using the length of the transient message and the reading speed of the user to calculate the time.

10. The method of any of examples 1-9 wherein the time to remove the message is a function of observing that the user has looked at the entire message.

11. The method of any of examples 1-10 wherein the determined time is a fixed amount of time starting from when it is first observed that the user is looking at the transient message.

12. The method of any of examples 1-11 wherein the message is an operating system message, and wherein the method is performed by the device executing code corresponding to the operating system.

13. The method of any of examples 1-12 and further comprising emphasizing the transient message when it is observed that the user is looking at the transient message.

14. A machine readable storage device having instructions for execution by a processor of the machine to perform:
observing via a camera of a device and a gaze tracking function that a user is looking at a transient message displayed on a display screen of a device;
determining a time to remove the transient message from the display screen as a function of the observing; and
removing the transient message as a function of the determined time.

15. The machine readable storage device of example 14 wherein the observing comprises detecting a position of the transient message at which the user is looking, wherein determining a time to remove the message corresponds to the user looking at an end of the transient message, and wherein removing the transient message comprises fading the message starting at the determined time.

16. The machine readable storage device of example 15 wherein fading the message comprises:
determining that a user has looked away from the transient message;
pausing the fading;
determining that a user is looking back at the transient message; and
continuing the fading when it is determined that the user is looking back at the transient message.

17. The machine readable storage device of any of examples 14-16 wherein the time is determined based on a total length of time that the user has looked at the transient message, wherein the total length of time that the user has looked at the transient message includes multiple different times that the user has looked at the transient message, and wherein determining a time comprises:
obtaining a length of the transient message;
obtaining a historical reading speed of the user; and
using the length of the transient message and the reading speed of the user to calculate the time.

18. A device comprising:
a processor;
a camera; and
a memory device having a program stored thereon for execution by the processor to:
observe via a camera of a device and a gaze tracking function that a user is looking at a transient message displayed on a display screen of a device;
determine a time to remove the transient message from the display screen as a function of the observing; and
remove the transient message as a function of the determined time.

19. The device of example 18 wherein observing comprises detecting a position of the transient message at which the user is looking, wherein determining a time to remove the message corresponds to the user looking at an end of the transient message, and wherein removing the transient message comprises fading the message starting at the determined time.

20. The device of example 19 wherein fading the message comprises:
determining that a user has looked away from the transient message;
pausing the fading;
determining that a user is looking back at the transient message; and
continuing the fading when it is determined that the user is looking back at the transient message.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:
1. A method comprising:
observing via a camera of a device and a gaze tracking function that a user is looking at a transient message displayed on a display screen of a device, wherein the observing comprises detecting a position of the transient message at which the user is looking;
determining a time to remove the transient message from the display screen as a function of the observing, wherein determining a time to remove the message corresponds to the user looking at an end of the transient message; and
removing the transient message as a function of the determined time, wherein removing the transient message comprises fading the message starting at the determined time, and wherein fading the message comprises:
determining that a user has looked away from the transient message;
pausing the fading;
determining that a user is looking back at the transient message; and
continuing the fading when it is determined that the user is looking back at the transient message.

2. The method of claim 1 wherein the time is determined based on a total length of time that the user has looked at the transient message.

3. The method of claim 2 wherein the total length of time that the user has looked at the transient message includes multiple different times that the user has looked at the transient message.

4. The method of claim 1 wherein determining a time comprises:
  obtaining a length of the transient message;
  obtaining a historical reading speed of the user; and
  using the length of the transient message and the reading speed of the user to calculate the time.

5. The method of claim 1 wherein the time to remove the message is a function of observing that the user has looked at the entire message.

6. The method of claim 1 wherein the determined time is a fixed amount of time starting from when it is first observed that the user is looking at the transient message.

7. The method of claim 1 wherein the message is an operating system message, and wherein the method is performed by the device executing code corresponding to the operating system.

8. The method of claim 1 and further comprising emphasizing the transient message when it is observed that the user is looking at the transient message.

9. A non-transitory machine readable storage device having instructions for execution by a processor of the machine to perform:
  observing via a camera of a device and a gaze tracking function that a user is looking at a transient message displayed on a display screen of a device, wherein the observing comprises detecting a position of the transient message at which the user is looking;
  determining a time to remove the transient message from the display screen as a function of the observing, wherein determining a time to remove the message corresponds to the user looking at an end of the transient message, and wherein removing the transient message comprises fading the message starting at the determined time; and
  removing the transient message as a function of the determined time, and wherein fading the message comprises:
    determining that a user has looked away from the transient message;
    pausing the fading;
    determining that a user is looking back at the transient message; and
    continuing the fading when it is determined that the user is looking back at the transient message.

10. The non-transitory machine readable storage device of claim 9 wherein the time is determined based on a total length of time that the user has looked at the transient message, wherein the total length of time that the user has looked at the transient message includes multiple different times that the user has looked at the transient message, and wherein determining a time comprises:
  obtaining a length of the transient message;
  obtaining a historical reading speed of the user; and
  using the length of the transient message and the reading speed of the user to calculate the time.

11. A device comprising:
  a processor;
  a camera; and
  a memory device having a program stored thereon for execution by the processor to:
    observe via a camera of a device and a gaze tracking function that a user is looking at a transient message displayed on a display screen of a device, wherein observing comprises detecting a position of the transient message at which the user is looking;
    determine a time to remove the transient message from the display screen as a function of the observing, wherein the time to remove the message corresponds to the user looking at an end of the transient message; and
    remove the transient message as a function of the determined time, wherein the transient message is removed by fading the message starting at the determined time by:
      determining that a user has looked away from the transient message;
      pausing the fading;
      determining that a user is looking back at the transient message; and
      continuing the fading when it is determined that the user is looking back at the transient message.

* * * * *